March 18, 1924.  
O. O. NYGAARD  
1,487,177  
VARIABLE LOAD SUPPORTING AND SHOCK ABSORBING DEVICE  
Filed Jan. 13, 1921  
5 Sheets-Sheet 1
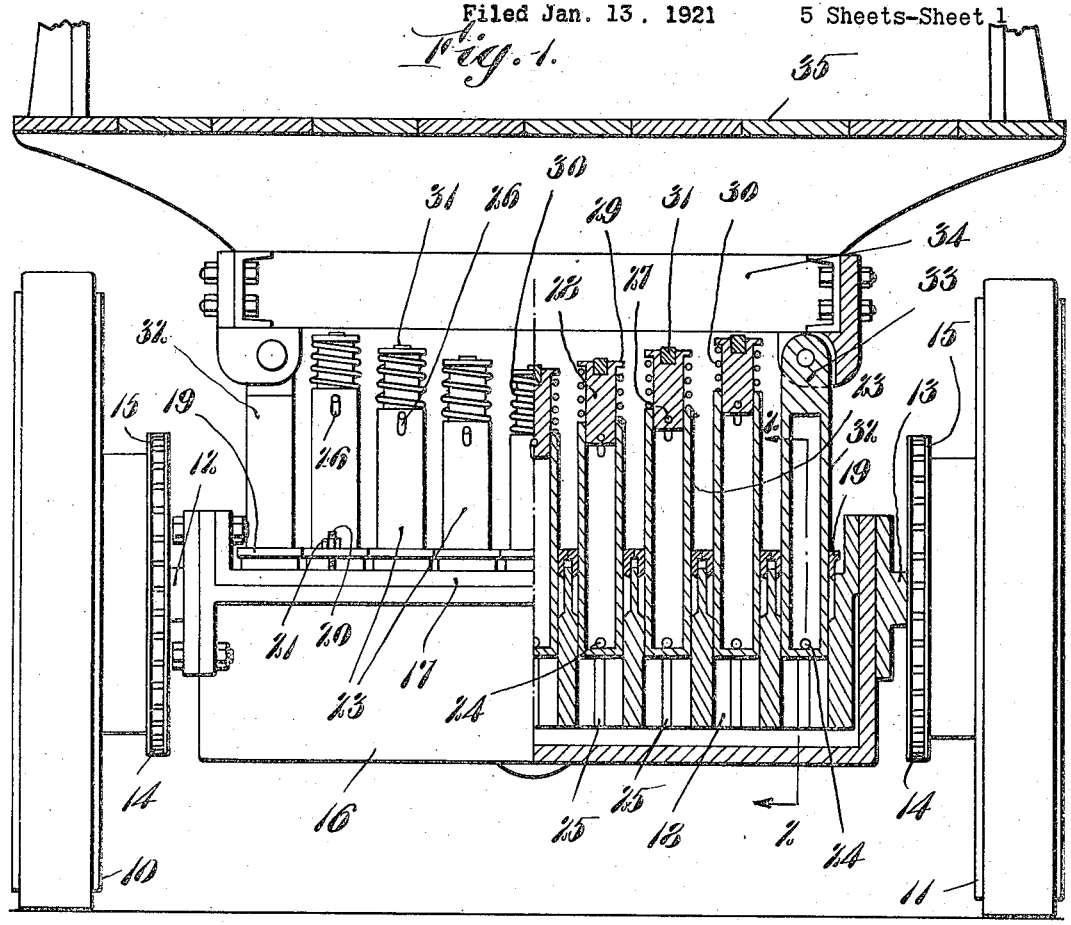
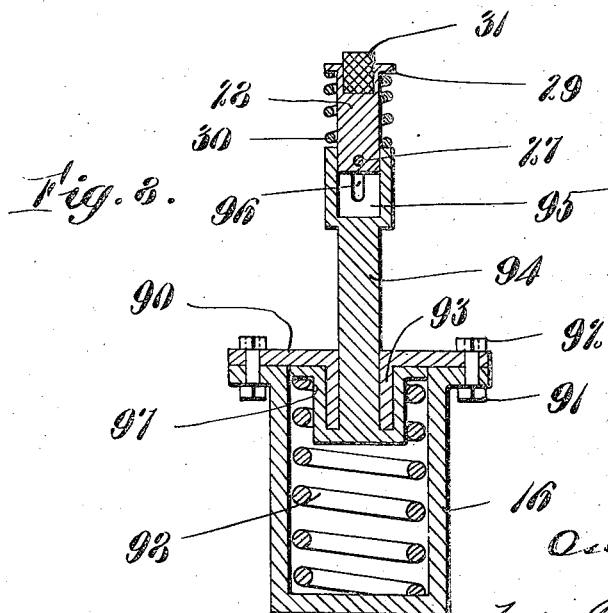
Inventor:  
Oscar O. Nygaard  
by James R. Hodder  
atty.

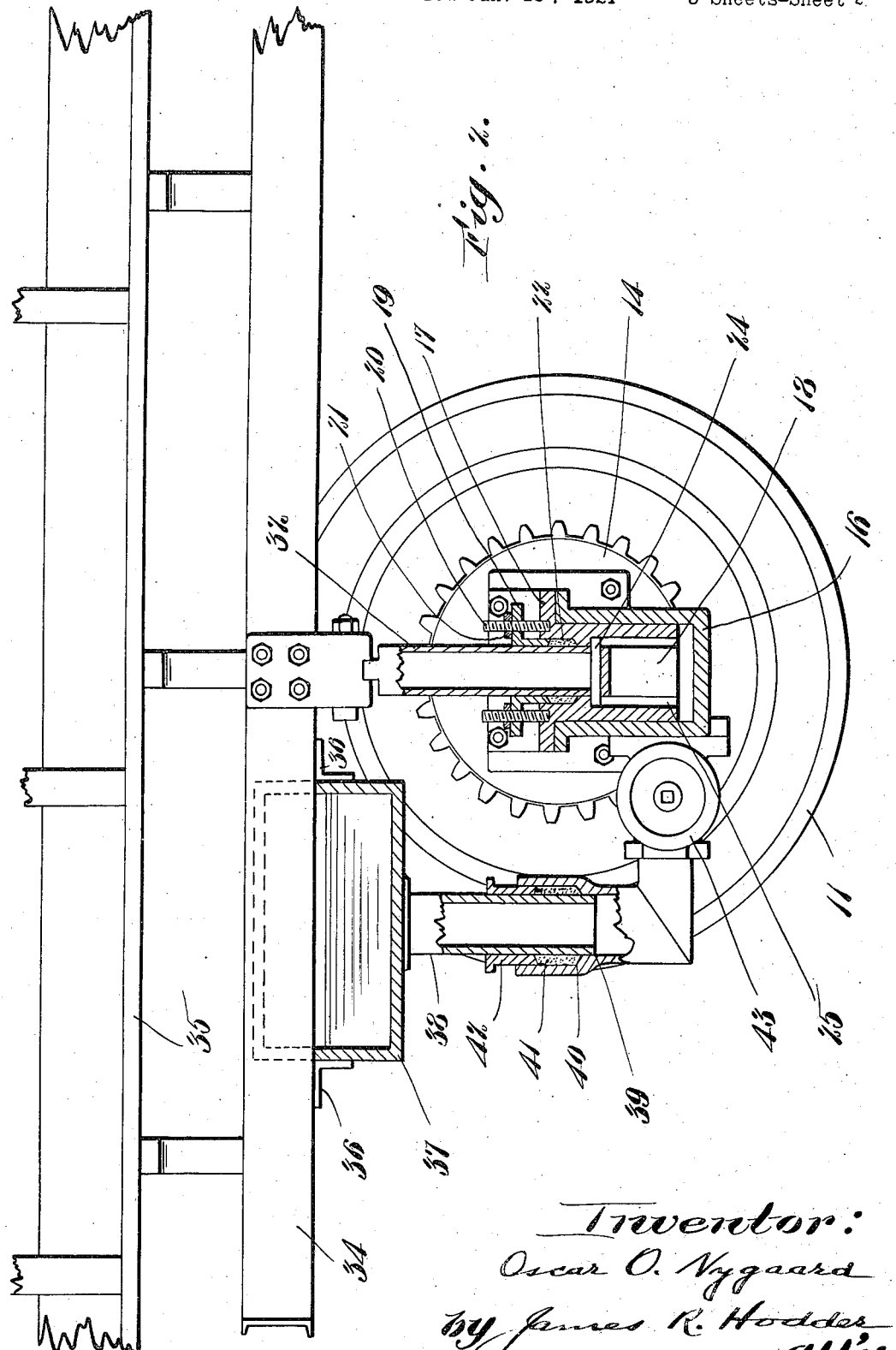

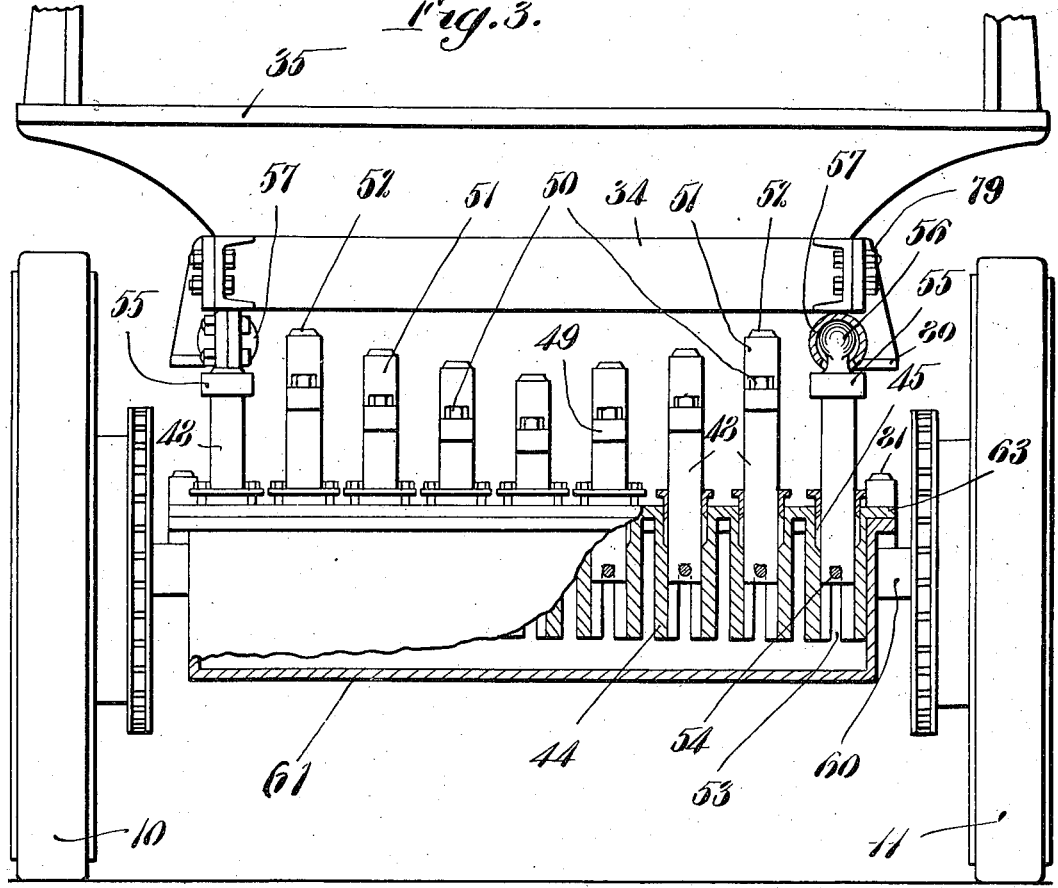
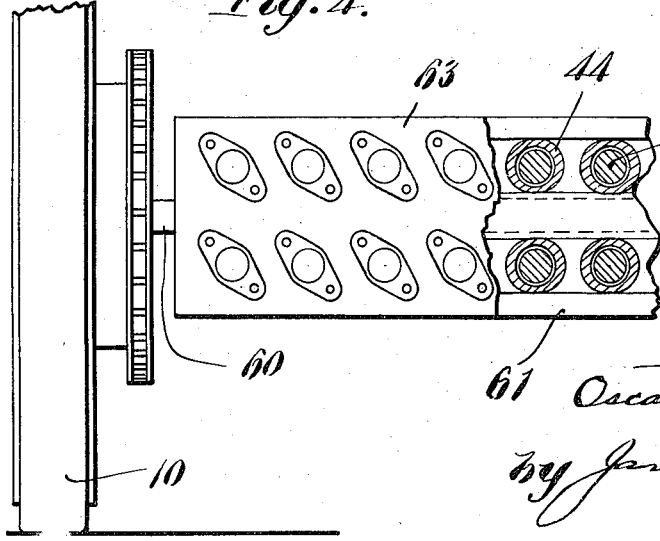
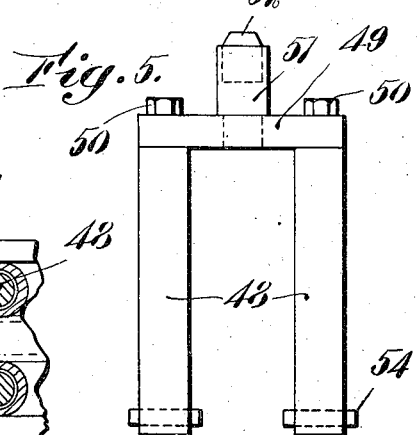

March 18, 1924.
O. O. NYGAARD
1,487,177
VARIABLE LOAD SUPPORTING AND SHOCK ABSORBING DEVICE
Filed Jan. 13, 1921 5 Sheets-Sheet 4
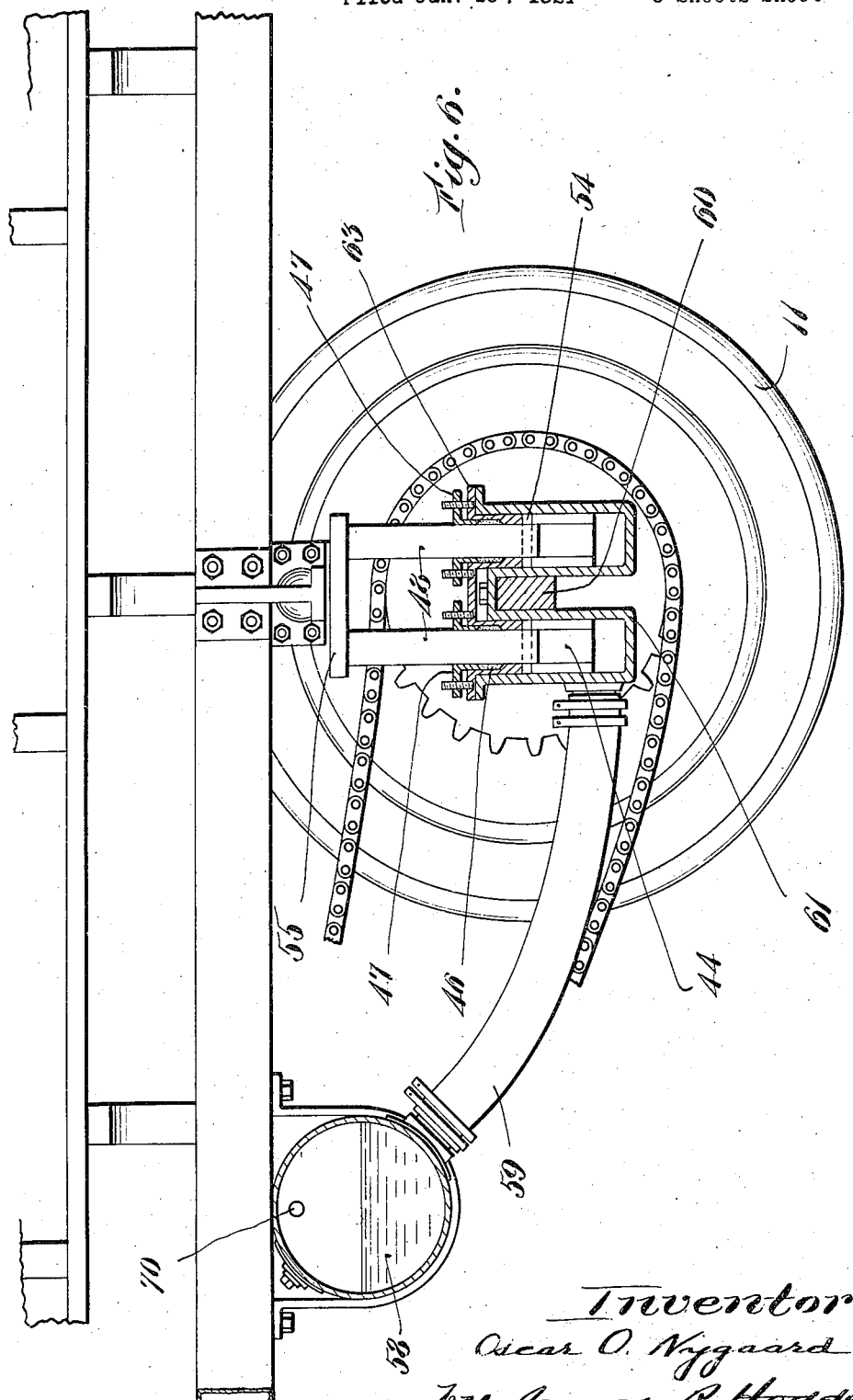

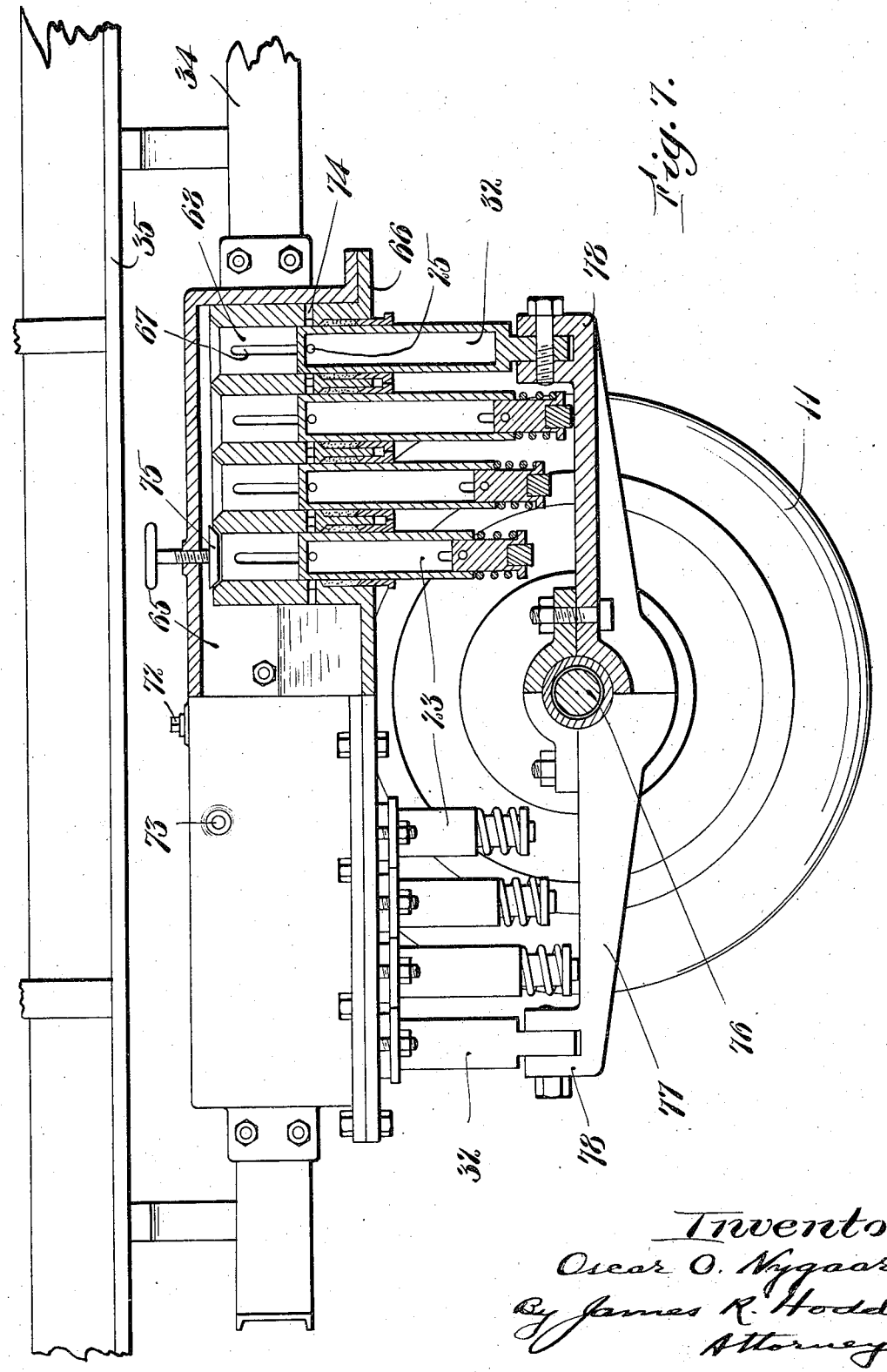

Patented Mar. 18, 1924.

1,487,177

UNITED STATES PATENT OFFICE.

OSCAR O. NYGAARD, OF SAUGUS, MASSACHUSETTS.

VARIABLE LOAD-SUPPORTING AND SHOCK-ABSORBING DEVICE.

Application filed January 13, 1921. Serial No. 437,049.

*To all whom it may concern:*

Be it known that I, OSCAR O. NYGAARD, a citizen of the United States, and resident of Saugus, in the county of Essex and State of Massachusetts, have invented an Improvement in Variable Load-Supporting and Shock-Absorbing Devices, of which the following description, in connection with the accompanying drawings, is a specification, like letters on the drawings representing like parts.

My present invention relates to shock absorbers, and more particularly to variable load supporting and shock absorbing devices for use in motor driven vehicles, such as trucks and the like.

In designing motor driven vehicles it is customary to so proportion the springs, on which the body and load are carried, that they act with greatest efficiency when carrying their normal load. As a consequence the springs are too stiff when the vehicle is empty, and too flexible when heavily loaded. Strict instructions are given by makers of such vehicles against overloading, but it is unusual to find such instructions obeyed. As a consequence of the prevailing method of spring design, the frame and all parts carried thereon are subjected to severe jolting when the vehicle is empty, and broken springs are the result of overloading. It has heretofore been attempted to absorb the shocks transmitted to the frame or chassis through the springs by adding shock absorbers to the equipment, but such devices do not remedy the defect, as the springs are still too stiff when the vehicle is empty and too flexible when overloaded.

With a view to obviating the objections noted above, I have devised my present invention, and have produced an improved construction in which the usual leaf springs may be entirely dispensed with, and the frame or chassis mounted on the wheels by a device that is at once a spring and shock absorbing element. By this means the frame or chassis is actually floated on the wheels in such a manner that a perfect spring and shock absorbing effect is obtained irrespective of whether the vehicle is empty or overloaded. One of the principal features of my improved construction is that of discarding the usual spring suspension of the frame or chassis and incorporating or associating with the axle of the vehicle a combined spring and shock absorbing device. Such device may be made adjustable so that the cushioning effect may be as small or as large as desired, and should it be deemed expedient, I may provide buffers that assist or supplement the shock absorbing device.

In my copending application, Ser. No. 418,271, filed Oct. 20, 1920, I have claimed broadly the use of a resilient receptacle for supporting the load to be carried by the running gear of a vehicle, with provision for allowing universal movement of the running gear and load carrying platform within certain prescribed limits. My present invention is adapted for more universal use, and may be, in some instances, substituted for essential elements of the running gear.

In the accompanying drawings illustrating the preferred embodiment of my invention, Fig. 1 is partly a front elevational, and a vertical sectional view through the longitudinal centre of one form of my invention;

Fig. 2 is a vertical cross sectional view, taken on the line 2—2 of Fig. 1;

Fig. 3 is a vertical sectional view, partly in elevation, of another form of my invention;

Fig. 4 is a fragmentary plan view, partly in section, of the construction illustrated in Fig. 3;

Fig. 5 is a detail of a pair of connected plungers or pistons;

Fig. 6 is a vertical cross sectional view of a construction similar to that illustrated in Fig. 3, Fig. 7 is partly a front elevational, and a vertical cross sectional view of still another form of my invention, and Fig. 8 is a vertical sectional elevation of a still further modification of my invention.

Referring to the drawings, and more particularly to Figs. 1 and 2, 10 and 11 designate wheels rotatably mounted on stub shafts 12 and 13 respectively, and provided with sprockets 14 over which pass the usual driving chains 15. These stub shafts 12 and 13 are attached, as shown, to a trough 16, the length of the trough being such that when the stub shafts are attached thereto, the gage of the vehicle will be standard, or any other gage that may be desired. Fitting on the top of the trough 16 is a combined cover and cylinder block 17, the various cylinders being designated 18. The top of the cylinders are bored out to receive glands 19, studs 20 screwed into the top of the block 17 passing through holes in the gland, nuts 21 being provided to force the glands 19 into the cylinders and compress the packing 22 placed in the bored out portion or stuffing box. Slidably mounted in the cylinders 18 are pistons or plungers 23, open at their upper end and closed at their lower end. A transverse pin 24 is provided in the lower end of the pistons 23 and engage in vertical slots 25 in the cylinders 18, this construction prevents rotative movement and acts as a stop at the extreme limit of outward travel, of the said pistons. Diametrically arranged elongated slots 26 are provided in each piston 23 near the tops thereof for receiving pins 27 secured near the bottom of the spring holders 28, slidably mounted in the open end of the pistons. The top ends of said spring holders 28 are provided with flanges 29, and coil springs 30, mounted on said holders between the top of the pistons 23 and the bottom of the flanges 29, hold the said holders in their uppermost position. On the top of each spring holder 28 is a recess in which is secured a resilient buffer 31. The cylinders 18 at each end of the block 17 have pistons 32 mounted therein for sliding movement, these pistons 32 being different from the pistons 23 in that their upper end is closed and provided with connecting means 33 for connecting the entire mechanism above described to the frame 34 carrying the load platform 35.

Suspended from the frame 34 on angle irons 36 is a reservoir 37, from the bottom of which leads a pipe 38. The lower end of this pipe 38 leads into a pipe 39, the upper end of which is formed with a stuffing box 40 to receive the packing 41, a gland 42 being utilized to form a tight joint between the two pipes 38 and 39. The lower end of the pipe 39 extends toward and is attached to a choker valve 43 fastened to the trough 16, as clearly shown in Fig. 2. The reservoir 37 is partially filled with a fluid, such as oil or water, this fluid filling the pipes 38 and 39 and the lower part of the trough 16. The compressed air above the fluid in the reservoir 37 is further compressed when the fluid is forced back therein by the downward movement of the pistons 23 and 32. The movements of the said pistons may be retarded and regulated to control the rebound from sudden jolts or shocks by manipulation of the valve 43. It will be noted that the pistons 23 are of gradually increasing length from the middle one to the outer ones, and that therefore, the normal position of the device is that shown in Fig. 1, with the weight of the frame 34 and parts carried thereby, supported on the pistons 32. The amount of liquid in the reservoir and the pressure of the air therein are so proportioned that the pistons will support the frame 34 and parts carried thereby, when no, or only a light load, is carried on said frame. Should the vehicle proceed along the ordinary road under these conditions, the shocks caused by the movement up and down of the wheels 10 and 11 as the same pass over the inequalities of the road, and that are ordinarily transmitted to the frame 34, are absorbed by the relative movement of the trough 16 and pistons 32. Should these shocks be severe, or the load carried increase the pistons 23, adjacent the pistons 32, come into engagement with the frame 34, first the resilient buffer 31 acting, then the springs 30 and finally the pistons 23 themselves. The springs 30 are preferably of such proportion and tension as to require approximately the same amount of weight or shock for its full compression that it would take to move the plunger against the pressure in the cylinder, thereby effecting a gradual load supporting and shock absorbing device that will act with equal efficiency under all load conditions, from light to full load. As the pistons 32 and 23 move downwardly in the cylinders 18, the fluid is forced through the pipes 38 and 39 into the reservoir 37 until equilibrium exists, the area, and the pressure balancing the load on the pistons.

In the form of my invention illustrated in Figs. 3, 4, 5 and 6, I have arranged the wheels 10 and 11 on the supporting axle 60 and on this axle mount a bifurcated trough 61, a cover plate 63 having cylinders or guides 44 being arranged in said trough on each side of the axle 60, as clearly shown in Figs. 4 and 6. These cylinders are arranged in pairs, the cylinders of each pair being on opposite sides of the axle 60. The upper end of these cylinders 44 are bored out to form stuffing boxes 45 to receive the packing 46, glands 47 being utilized to compress the packing 46 and form a tight joint between the cylinders 44 and pistons 48, these pistons being arranged in pairs, as shown, on crossheads 49, being attached to such crossheads by bolts 50. On the cross-heads 49 and extending upwardly therefrom, are buffer holding means 51, buffers 52, of resilient material, being secured in depressions in the top of the buffer holding means. Each cylinder 44 is provided with diametrically arranged slots 53 in which slide pins 54 secured to the pistons 48 near the lower end thereof, and which limit the upward movement of said pistons.

The two outermost pairs of pistons are attached to cross-heads 55 which have attached to their top surfaces balls 56, these balls being fitted in ball sockets 57 secured to the frame 34 by a bracket 79. The bracket 79 has an outstanding plate 80 adapted to act as a stop or rest on the resilient bumper 81 in case of accident to the device or too much of an overload. The frame 34 is normally carried by the outermost pairs of pistons and the length of the remaining pairs of pistons is gradually increased from the most central pair outwardly to the outermost pairs, as clearly shown in Fig. 3. A fluid holding tank 58 is secured to the frame 34 in any convenient manner and is connected to the trough by a flexible conduit 59. The tank 58 is partially filled with fluid, such as oil or water, the space above the fluid being air under pressure. The operation of this modification of my invention is substantially similar to the operation of the modification illustrated in Figs. 1 and 2. As the load carried by the frame 34 increases, or as the vertical movement of the cylinders toward the frame increases, more and more of the pistons are brought into position to support the frame, the pistons, as they move downwardly in the cylinders, forcing the fluid into the tank 58 and increasing the pressure of the air above said fluid. The air may be subjected to any desired initial pressure, a connection 70 being provided for connecting the said tank to an air pump or similar device.

In the modification illustrated in Fig. 7, I have mounted a combined trough and pressure tank 65 on either side of the frame 34, the open end of the tank facing downwardly. The cover and cylinder block 66 is provided with a plurality of guides or cylinders 68, each provided with diametrically arranged grooves 67 to receive the pins 25 in the pistons 23 and 32. The pistons used in this modification, being identical in construction to the pistons illustrated in Figs. 1 and 2, will not be described in detail. The tank 65 is partially filled with fluid, as shown in Fig. 7, a filling plug 72 being provided for this purpose, and an air inlet 73 is provided for connecting the tank to an air pump or the like for filling the tank, above the fluid, with air under pressure. A plurality of holes 74 in the cylinder block provides sealing grooves for the pistons 23 and 32, while a choker valve 75 is shown at the open end of a cylinder to regulate the ease of movement of the piston in the cylinders. While I have shown but one choker valve, it is to be understood that I may provide any number of said valves, up to the number of cylinders and that all of said valves may be connected together, to operate in unison or singly if desired. The axle 76 on which the wheels, but one of which, 11, is shown, has pivotally mounted thereon, beneath each tank 65, a member 77 provided with means 78 at each end to connect with the outermost pistons 32, the upper surface of this member being adapted to be engaged successively by the pistons 23 as the frame 34 and axle 76 move toward each other.

Referring now to Fig. 8, wherein I have shown a modification of my invention in which the fluid pressure chamber and accessories are replaced by springs, 16 designates the tank provided with a cover 90 and secured thereto by bolts and nuts 91 and 92 respectively. This cover 90 is provided with a plurality of depending cylindrical bearings 93, but one of which is shown, each bearing registering with a hole in the cover plate 90. Slidably mounted in the bearing 93 is a plunger 94, provided at its top end with a cylindrical chamber 95 having slots or grooves 96 to receive the cross pin 27 in the sliding plunger 28, a coil spring 30 located between the top surface of the plunger 94 and a collar 29 on the top of the plunger 28 yieldingly holding the plunger in its topmost position. A buffer of resilient material 31 is seated in a depression in the top of the plunger 28. The lower end of the plunger 94 is provided with a cylindrical member 97 and a coil spring 98 is located between the member 97 and the bottom of the tank 16. The form thus described may be substituted for the fluid operated and operating means described particularly with reference to Figs. 1 and 2.

In all the modifications of my invention, the underlying idea is that the load, frame and associated parts are supported by a plurality of separate resilient supporting means adapted to automatically engage and disengage with the frame and associated parts, in proportion to the weight of the load carried, and to the velocity of shock, and contained in a device of such construction as can be installed on a vehicle, preferably to take the place of the ordinary leaf springs; the resiliency of such device remaining equally resilient as the load on the frame and and the associated parts varies and increases or decreases.

The construction of my device is such that the resilient supporting means are actively engaged in exact proportion to the weight carried by the supporting and driving wheels, and to the shocks to which these latter may be subjected, and thus my improved invention differs radically from structures in which the frame and load are supported by leaf springs alone or by springs and auxiliary shock absorbing means, whether such shock absorbing means be of the friction, spring, or cylinder and plunger type. The resilient supporting means are proportioned instantly and automatically by the load to be supported.

While I have necessarily described the preferred embodiment of my invention somewhat in detail, it is to be understood that I may vary the size, shape and arrangement of parts constituting my improved invention within wide limits without departing from the spirit of the invention.

Having thus described my invention, what I claim as new is:—

1. In a device of the class described, the combination of a pair of members spaced apart from but associated with and movable toward and from each other, a fluid holding tank, means for placing the contents of said tank under pressure, a plurality of means in said tank for yieldingly supporting one of said members on the other, and a plurality of other yielding supporting means in said tank brought into operation to assist said first supporting means as the pair of members approach each other.

2. In a device of the class described, the combination of a pair of members spaced apart from but associated with and movable toward and from each other, a fluid holding tank, means for placing the contents of said tank under pressure, a pair of plungers inserted through the floor or roof of said tank to the interior thereof for yieldingly supporting one of said members on the other, a plurality of other plungers inserted through the floor or roof of said tank to the interior thereof, and means for bringing said plurality of plungers successively into position to assist said pair of plungers for yieldingly supporting one of said members on the other as the pair of members approach each other.

3. In a device of the class described, the combination of a pair of members spaced apart from but associated with each other, a fluid holding tank, and means for placing the contents of said tank under pressure, a cylinder in said tank, and means in said cylinder for yieldingly supporting one of said members on the other.

4. In a device of the class described, the combination of a pair of members spaced apart from but associated with each other, a fluid holding tank, means for placing the contents of said tank under pressure, a plurality of cylinders in said tank, and means in said cylinders for yieldingly supporting one of said members on the other.

5. In a device of the class described, the combination of a pair of members spaced apart from but associated with and movable toward and from each other, a fluid holding tank, means for placing the contents of said tank under pressure, a pair of cylinders in said tank, means in said cylinders for yieldingly supporting one of said members on the other, a plurality of other cylinders in said tank, and yielding supporting means in said cylinders adapted to be brought successively into operation to assist said first supporting means as the pair of members approach each other.

6. In a device of the class described, the combination of a pair of members spaced apart from but associated with each other, a fluid holding tank, means for placing the contents of said tank under pressure, a plurality of guides in said tank, and a plunger in each of said guides for yieldingly supporting one of said members on the other.

7. In a device of the class described, the combination of a pair of members spaced apart from but associated with and movable toward and from each other, a fluid holding tank, means for placing the contents of said tank under pressure, a guide in said tank, a plunger in said guide for yieldingly supporting one of said members on the other, a plurality of other guides in said tank, a plunger in each of said guides, and means for bringing said plungers successively into position to assist said first supporting plunger to yieldingly support one of said members on the other as the pair of members approach each other.

8. In a device of the class described, the combination of a pair of members spaced apart from but associated with and movable toward and from each other, a fluid holding tank, means for placing the contents of said tank under pressure, a guide in said tank, a plunger in said guide, said plunger attached to one of said members, a plurality of other guides in said tank, a plunger in each of said guides, and means to successively connect said plungers to one of said members as the pair of members approach each other.

9. In a device of the class described, the combination of a pair of members spaced apart from but associated with each other, one of said members being a load carrying member, a fluid holding tank, means for placing the contents of said tank under pressure, a pair of guides in said tank, a plunger in each of said guides, said plungers flexibly connected to one of said members for yieldingly supporting one of said members on the other, a plurality of other guides in said tank, a plunger in each of said guides, and means to successively connect and disconnect said plungers with one of said members according to the load carried.

10. In a device of the class described, the combination of a supporting member adapted for movement in a vertical plane, a cylinder mounted thereon, a piston in said cylinder, a second member attached to said piston, means for yieldingly supporting said piston, in said cylinder, whereby movement of the supporting member in a vertical plane will not be transmitted to said second member, a plurality of other cylinders mounted on said supporting member, a piston mounted in said plurality of other cylinders, means for yieldingly supporting said pistons in said cylinders, and means for bringing said plurality of pistons into association with said second member as the extent of movement of the supporting member in a vertical plane is increased.

11. In a device of the class described, the combination of a supporting member adapted for movement in a vertical plane, a cylinder mounted thereon, a piston in said cylinder, a second member attached to said piston, means for yieldingly supporting said piston in said cylinder, whereby movement of the supporting member in a vertical plane will not be transmitted to said second member, a plurality of other cylinders mounted on said supporting member, a piston mounted in said plurality of other cylinders, means for yieldingly supporting said pistons in said cylinders, and means for successively bringing said plurality of pistons into association with said second member as the extent of movement of the supporting member in a vertical plane is increased.

12. In a device of the class described, the combination of a fluid holding tank, a trough, means connecting said tank with said through, an open ended cylinder mounted in said trough, a piston in said cylinder, and means for placing the fluid in said holding tank under pressure, whereby the piston is yieldingly supported in said cylinder.

13. In a device of the class described, the combination of a fluid holding tank, a trough, means connecting said tank with said trough, an open ended cylinder mounted in said trough, a piston in said cylinder, a load platform supported on said piston, and means for placing the fluid in said holding tank under pressure, whereby the piston is yieldingly supported in said cylinder.

14. In a device of the class described, the combination of a fluid holding tank, a trough, means connecting said tank with said trough, a plurality of open ended cylinders mounted in said trough, a piston in each of said cylinders, a load platform supported on said pistons, and means for placing the fluid in said holding tank under pressure, whereby the pistons are yieldingly supported in said cylinders.

15. In a device of the class described, the combination of a fluid holding tank, a trough, means connecting said tank with said trough, a plurality of open ended cylinders mounted in said trough, a piston in each of said cylinders, a load platform supported on some of said pistons, means for placing the fluid in said holding tank under pressure, whereby all the pistons are yieldingly supported in said cylinders, and means for bringing the pistons successively into position to yieldingly support said loading platform.

16. In a device of the class described, the combination of a supporting member and a supported member, a plurality of cylinders mounted on said supporting member, a plunger in each of said cylinders, a fluid pressure chamber connected to said cylinders for yieldingly supporting said plungers, means in said cylinders for regulating the flow of fluid to and from said cylinders to retard and moderate the movements of the plungers in said cylinders to absorb severe shocks or jolts, and means to automatically and yieldingly connect and disconnect said plungers to operate proportionate to the load supported.

17. In a device of the class described, the combination of a supporting member and a supported member, a plurality of cylinders mounted on one of said members, a plunger in each of said cylinders, a pressure chamber adapted to hold fluid connected to said cylinders for yieldingly acting on said plungers, and shock absorbing means to regulate, retard and moderate the movements of said supported member.

18. In a device of the class described, the combination of a pair of members spaced apart from but associated with and movable toward and from each other, a fluid holding tank, means for placing the contents of said tank under pressure, a plurality of means in said tank for yieldingly supporting one of said members on the other, a plurality of other yielding supporting means in said tank, said plurality of other means brought into operation to assist said first supporting means as the pair of members approach each other, and shock absorbing means to regulate the rebound action of said supporting means caused by severe shocks and jolts.

19. In a device of the class described, the combination of a fluid holding tank, means for placing the contents of said tank under pressure, a second fluid holding tank, flexible connecting means between the tanks, a guideway in said second tank, a plunger in said guideway, a load platform supported on said plunger, a plurality of other guideways in said second tank, a plunger in each of said guideways to assist said first supporting plunger as the load on the platform is increased, means to yieldingly engage and disengage said assisting plungers according to the load carried, and means between said first and second tanks to control the rebound action of the plungers caused by severe shocks and jars.

20. In a device of the class described, the combination of a pair of members spaced apart from but associated with each other, a fluid holding tank, means for placing the contents of said tank under pressure, a plurality of guides in said tank, a plunger in each of said guides, said plungers associated with each other for holding said spaced members apart, means for preventing said plungers from being pushed out from said tank by the pressure therein, and means to prevent leakage around said plungers.

21. In a device of the class described, the combination of a supporting member and a supported member, a fluid holding tank attached to said supported member, means for placing the contents of said tank under pressure, a pair of plungers inserted through the floor to the interior of said tank, connecting means secured to said supporting member, said pair of plungers flexibly attached to said connecting means for yieldingly supporting said supported member, a plurality of other plungers inserted through the floor to the interior of said holding tank, to assist said pair of plungers, and means for automatically bringing said plurality of plungers into association with said connecting means proportionate to the load supported.

22. In a device of the class described, the combination of a supporting member and a supported member, a fluid holding tank attached to said supported member, means for placing the contents of said holding tank under pressure, a plurality of cylinders in said tank, a plunger in each of said cylinders, said plungers being of different length with respect to each other, means for preventing leakage around said plungers, means to limit the travel of said plungers outwardly from said cylinders, a beam secured to said supporting member, means thereon for flexibly connecting to some of said plungers, and means for bringing other of said plungers into association with said beam upon movement of said supported member toward said beam.

23. In a device of the class described, the combination of a pair of members spaced apart from but associated with each other, a fluid holding tank, means for placing the contents of said tank under pressure, a guide in said tank, a plunger in said guide inserted through a wall of said tank for yieldingly supporting one of said members on the other, and resilient means in the end of said plunger for yieldingly bringing the plunger into contact with one of said pair of members.

24. In a device of the class described, the combination of a pair of members spaced apart from but associated with each other, a cylinder, a piston in said cylinder for yieldingly supporting one of said members on the other, a plurality of other cylinders, a piston in each of said cylinders for assisting said first supporting piston as the load on the supported member is increased, and resilient means in the end of each of said assisting pistons for yieldingly bringing said pistons into contact with one of said pair of members.

25. In a device of the class described, the combination of a pair of members spaced apart from but associated with each other, a cylinder, means in said cylinder for yieldingly supporting the load of one of said members on the other, additional yielding load supporting means mounted on said first supporting means in the cylinder, and resilient means on said additional means for yieldingly bringing said supporting means into association with one of said members.

26. In a device of the class described, the combination of a pair of members spaced apart from but associated with each other, a fluid holding tank, means for placing the contents of said tank under pressure, a cylinder in said tank, a plunger in said cylinder for yieldingly supporting one of said members on the other, and yielding load supporting means mounted on said plunger adapted to operate in advance of said plunger.

27. In a device of the class described, the combination of a pair of members spaced apart from but associated with each other, a fluid holding tank, means for placing the contents of said tank under pressure, a cylinder in said tank, a plunger in said cylinder for yieldingly supporting one of said members on the other, yielding load supporting means mounted on said plunger, and means for bringing the load gradually onto said plunger.

28. In a device of the class described, the combination of a pair of members spaced apart from but associated with each other, a fluid holding tank, means for placing the contents of said tank under pressure, a cylinder in said tank, a plunger in said cylinder for yieldingly supporting one of said members on the other, and intermediate load supporting means between said plunger and one of said members for transmitting the load of said supported member gradually onto said plunger.

29. In a device of the class described, the combination of a pair of members spaced apart from but associated with each other, a cylinder, a plunger in said cylinder for yieldingly supporting one of said members on the other, a second plunger inside said first plunger, and yielding supporting means between said plungers for bringing the load gradually onto said first plunger.

30. In a device of the class described, the combination of a pair of members spaced apart from but associated with each other, a cylinder, a plunger in said cylinder for yieldingly supporting one of said members on the other, a second plunger adapted to pass inside said first plunger, resilient means in the end of said second plunger for yieldingly bringing said plunger into contact with one of said members, and yielding supporting means between the plungers for gradually transmitting the load from said second plunger onto said first plunger.

31. In a device of the class described, the combination of a pair of members spaced apart from but associated with each other, a fluid holding tank, means for placing the contents of said tank under pressure, a plurality of cylinders in said tank, a plunger in each of said cylinders for yieldingly supporting one of said members on the other, additional means on each of said plungers adapted to yieldingly support and gradually transmit the overload on one plunger onto the succeeding load supporting plunger.

32. In a device of the class described, the combination of a pair of members spaced apart from but associated with each other, a fluid holding tank, means for placing the contents of said tank under pressure, a plurality of load supporting means in said tank for yieldingly supporting one of said members on the other, and additional means associated with said supporting means adapted to yieldingly support and gradually transmit the overload on one of said supporting means onto another of said supporting means.

33. In a device of the class described, the combination of a pair of members spaced apart from but associated with each other, a fluid holding tank, means for placing the contents of said tank under pressure, a plurality of plungers inserted through the floor or roof of said tank to the interior thereof, and a plurality of means in said tank for yieldingly supporting one of said members on the other, said plungers differing in length with respect to each other.

34. In a device of the class described, the combination of a pair of members spaced apart from but associated with each other, a tank, a plurality of rods inserted through a wall of said tank to the interior thereof, said rods differing in length with respect to each other, a plurality of means in said tank and associated with said rods for yieldingly supporting one of said members on the other, resilient means in the outer end of said rods for yieldingly bringing said rods into contact with one of said members as the pair of members approach each other, a plunger in the end of each of said rods, and yielding supporting means between said rods and said plungers for gradually transmitting the load on said plungers onto said rods.

35. In a device of the class described, the combination of a pair of members spaced apart from but associated with and movable toward and from each other, a tank, a guideway in said tank, a rod inserted through a wall of said tank to the interior thereof, means in said tank and associated with said rod for yieldingly supporting one of said members on the other, a plurality of other guideways in said tank, a plurality of other rods inserted through a wall to the interior of said tank, a plurality of other yielding supporting means in said tank and associated with said rods to assist said first supporting means as the pair of members approach each other, additional means mounted on each of said rods for yieldingly supporting and gradually transmitting the overload on one of said means in the tank onto another of said means in the tank, and means to automatically connect and disconnect said plurality of rods and means with one of said members in exact proportion to the load carried on said supported member.

36. In a vehicle, a supported member, a pair of wheels, a shaft between said pair of wheels, a hollow member on each side of the shaft, a member straddling said shaft and connected to the hollow member on each side of said shaft, and means in each of said hollow members for yieldingly supporting said supported member.

37. In a vehicle, a supported member, a pair of wheels, a shaft between said wheels, a trough on each side of said shaft, and means in said troughs for yieldingly supporting said supported member.

38. In a vehicle, a supported member, a pair of wheels, a shaft between said wheels, a trough on each side of said shaft, means in said troughs for yieldingly supporting said supported member, and hollow connecting means between said troughs.

39. In a vehicle, a supported member, a pair of wheels, a fluid holding tank, shafts for said wheels and attached to each side of the tank, means to place the contents of said tank under pressure, and means in said tank for yieldingly supporting said supported member.

40. In a vehicle, a pair of members spaced apart from but associated with and movable toward and from each other, a pair of wheels, a shaft for said wheels, a tank forming part of said shaft, a pair of springs in said tank for yieldingly supporting one of said members on the other, and a plurality of other springs in said tank adapted to be brought into action to assist said pair of springs as the spaced members approach each other.

41. In a vehicle, a pair of members spaced apart from but associated with and movable toward and from each other, a fluid holding tank and means to place the contents of said tank under pressure, a spring in said tank for yieldingly supporting one of said pair of members on the other, a plurality of other springs in said tank and means for bringing said springs into operation to assist said first spring as the spaced members approach each other, a plurality of guides in said tank, a plunger in each of said guides, said plungers cooperatively engaged with said plurality of springs for yieldingly supporting one of said spaced members on the other, and shock absorbing means in said tank for controlling the rebound action of said plungers and springs.

In testimony whereof, I have signed my name to this specification.

OSCAR O. NYGAARD.